US012711820B2

(12) United States Patent
Al Alawy et al.

(10) Patent No.: US 12,711,820 B2
(45) Date of Patent: Aug. 18, 2026

(54) METHOD FOR USING INTERNET OF THINGS ECOSYSTEM TO PREVENT VEHICLE ACCESS KEY SPOOFING

(71) Applicant: GM GLOBAL TECHNOLOGY OPERATIONS LLC, Detroit, MI (US)

(72) Inventors: Ahmed F. Al Alawy, Canton, MI (US); Venkata Naga Siva Vikas Vemuri, Farmington Hills, MI (US); Mustafa Hamada Chmeiseh, Shelby Township, MI (US); John Sergakis, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 7 days.

(21) Appl. No.: 18/925,337

(22) Filed: Oct. 24, 2024

(65) Prior Publication Data

US 2026/0120530 A1 Apr. 30, 2026

(51) Int. Cl.
*G07C 9/00* (2020.01)
*B60R 25/30* (2013.01)
*G16Y 40/50* (2020.01)

(52) U.S. Cl.
CPC .......... *G07C 9/00309* (2013.01); *B60R 25/30* (2013.01); *G16Y 40/50* (2020.01)

(58) Field of Classification Search
CPC ............ G07C 9/00309; G07C 9/00896; G07C 2209/63; G16Y 40/50; B60R 25/30; H04W 12/122; H04W 4/023; H04W 4/80; H04L 63/107
See application file for complete search history.

(56) References Cited

U.S. PATENT DOCUMENTS

2014/0179338 A1* 6/2014 Shang .................. H04W 4/023 455/456.1
2015/0148989 A1* 5/2015 Cooper .................. E05F 15/77 701/2

(Continued)

FOREIGN PATENT DOCUMENTS

DE 102023104917 A1 8/2024

OTHER PUBLICATIONS

German Office Action from counterpart DE1020241387998, dated Jul. 23, 2025.

(Continued)

*Primary Examiner* — Adnan Aziz

(57) ABSTRACT

A vehicle comprising a remote access controller arranged in the vehicle and configured to selectively execute a remote command originated by an access key device and to attempt to connect with an Internet of Things (IoT) device. If the remote access controller is securely connected to the IoT device, the remote access controller is configured to exchange information with an access key device, connect with the access key device, determine a location of the access key device relative to the vehicle, determine if the location of the access key device is within a predetermined range of the vehicle, and if the access key device is within a predetermined range of the vehicle, send a security request to the IoT device including the location of the vehicle. A vehicle component selectively controlled by the remote access controller based on the remote command.

20 Claims, 9 Drawing Sheets

(56) References Cited

U.S. PATENT DOCUMENTS

| | | | | |
|---|---|---|---|---|
| 2016/0055699 | A1* | 2/2016 | Vincenti | H04W 12/04 340/5.61 |
| 2016/0353305 | A1* | 12/2016 | Zakaria | H04W 24/10 |
| 2017/0186251 | A1* | 6/2017 | Lee | G07C 9/20 |
| 2018/0056939 | A1* | 3/2018 | Van Roermund | B60R 25/04 |
| 2018/0229689 | A1* | 8/2018 | Brown | G07C 9/00571 |
| 2022/0073031 | A1* | 3/2022 | Thivierge, Jr. | B60R 25/24 |
| 2024/0290154 | A1* | 8/2024 | Scholz | G07C 9/00896 |
| 2025/0308306 | A1* | 10/2025 | Saleh | G07C 9/00309 |

OTHER PUBLICATIONS

Whitepaper, CCC Digital Key—The Future of Vehicle Access; CARCONNECTIVITY consortium® (20 pages).

* cited by examiner

Access Key Device
140
Controller
142
Override Button
143
WiFi Access Point
150
Vehicle
110
Telematics System
114
Remote Access Controller
118
IOT Device
130
Controller
132
Vehicle Component(s)
133
Distributed Communications System
154
Server
162
Wireless Communication System
160
Manufacturer Server
170

METHOD FOR USING INTERNET OF THINGS ECOSYSTEM TO PREVENT VEHICLE ACCESS KEY SPOOFING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to access systems for vehicles, and more particularly to access systems for vehicles using an Internet of Things (IOT) ecosystem.

Vehicles typically use an access key device such as a key fob or smartphone to wirelessly access the vehicle, to start the ignition, and/or to perform other vehicle functions. Relay attacks and key spoofing involve criminals intercepting signals between a key fob and the vehicle. By tricking the car into thinking the wireless remote is nearby, criminals can unlock and start the vehicle without using a key. This type of theft exploits remote access systems that use wireless communication methods.

SUMMARY

A vehicle comprising a remote access controller arranged in the vehicle and configured to selectively execute a remote command originated by an access key device and to attempt to connect with an Internet of Things (IoT) device. If the remote access controller is securely connected to the IoT device, the remote access controller is configured to exchange information with an access key device, connect with the access key device, determine a location of the access key device relative to the vehicle, determine if the location of the access key device is within a predetermined range of the vehicle, and if the access key device is within a predetermined range of the vehicle, send a security request to the IoT device including the location of the vehicle. A vehicle component selectively controlled by the remote access controller based on the remote command.

In other features, the remote access controller is configured to execute the remote command from the access key device in response to the IoT device confirming the location of the access key device relative to the vehicle. If the remote access controller is not connected to the IoT device, the remote access controller is configured to execute the remote command if the location of the access key device is within the predetermined range of the vehicle. The vehicle component is selected from a group consisting of a door lock, a powered door, a heating, ventilation, and air conditioning (HVAC) system, an ignition system, and an autonomous driving controller of the vehicle.

A security system includes the vehicle of claim 1 and the access key device. The access key device includes a first controller configured to connect with the IoT device and the vehicle. The security system includes the IoT device. The IoT device includes a second controller configured to connect with the remote access controller of the vehicle and the first controller of the access key device. he IoT device is located one of remotely from the vehicle and in the vehicle.

A vehicle includes a remote access controller arranged in the vehicle and configured to selectively execute a remote command originated by an access key device and to attempt to connect with an Internet of Things (IoT) device. If the remote access controller is securely connected to the IoT device, the remote access controller is configured to not execute remote commands directly received by the vehicle from the access key device for the vehicle, and execute a remote command originated by the access key device and relayed by the IoT device to the vehicle. If the remote access controller is not connected to the IoT device, the remote access controller is configured to exchange information with an access key device, wirelessly connect to the access key device, determine a location of the access key device relative to the vehicle, determine if the location of the access key device is within a predetermined range of the vehicle, and if the access key device is within the predetermined range of the vehicle, execute a remote command sent by the access key device directly to the vehicle. A vehicle component is selectively controlled by the remote access controller based on the remote command.

In other features, the vehicle component is selected from a group consisting of a door lock, a powered door, a heating, ventilation, and air conditioning (HVAC) system, an ignition system, and an autonomous driving controller of the vehicle.

A security system includes the vehicle and the access key device. The access key device includes a first controller configured to selectively connect to at least one of the IoT device and the vehicle. The security system includes the IoT device.

In other features, the IoT device includes a second controller configured to pair with the remote access controller of the vehicle and the first controller of the access key device. The second controller of the IoT device is configured to relay the remote command from the access key device to the vehicle when the IoT device is connected to the vehicle. he IoT device is located one of remotely from the vehicle and in the vehicle.

A vehicle includes a remote access controller arranged in the vehicle and configured to selectively execute a remote command originated by an access key device and to attempt to connect with an Internet of Things (IoT) device. If the remote access controller is connected to the IoT device, the remote access controller is configured to connect with the access key device if the IoT device approves the access key device. If the remote access controller is not connected to the IoT device, the remote access controller is configured to exchange information with an access key device, wirelessly connect to the access key device, determine a location of the access key device relative to the vehicle, determine if the location of the access key device is within a predetermined range of the vehicle, and if the access key device is within a predetermined range of the vehicle, execute the remote command received from the access key device. A vehicle component is selectively controlled by the remote access controller based on the remote command.

In other features, the vehicle component is selected from a group consisting of a door lock, a powered door, a heating, ventilation, and air conditioning (HVAC) system, an ignition system, and an autonomous driving controller of the vehicle.

A security system includes the vehicle and the access key device. The access key device includes a first controller configured to selectively connect to at least one of the IoT device and the vehicle.

In other features, the security system includes the IoT device. The IoT device includes a second controller configured to pair with the remote access controller of the vehicle and the first controller of the access key device, and selectively approve the access key device based on a location of the access key device relative to the vehicle. The IoT device is located one of remotely from the vehicle and in the vehicle.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While the present disclosure is described below in the context of a remote access system for remotely controlling components of a vehicle, the system for securing access can be used in other mobile or stationary applications.

Figure 1A:
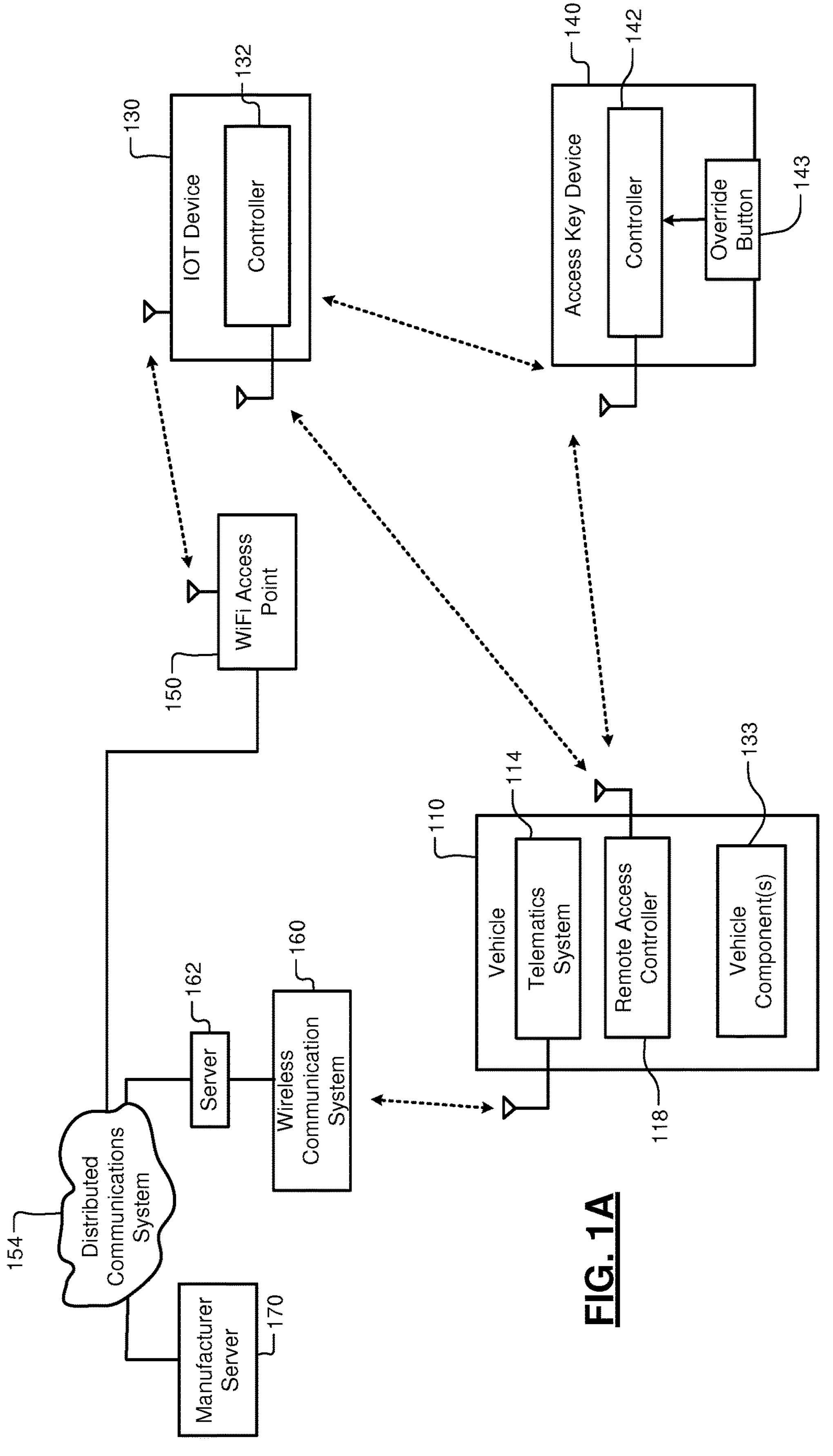
FIGS. 1A and 1B are functional block diagrams of a remote access system for a vehicle according to the present disclosure.
Figure 1B:
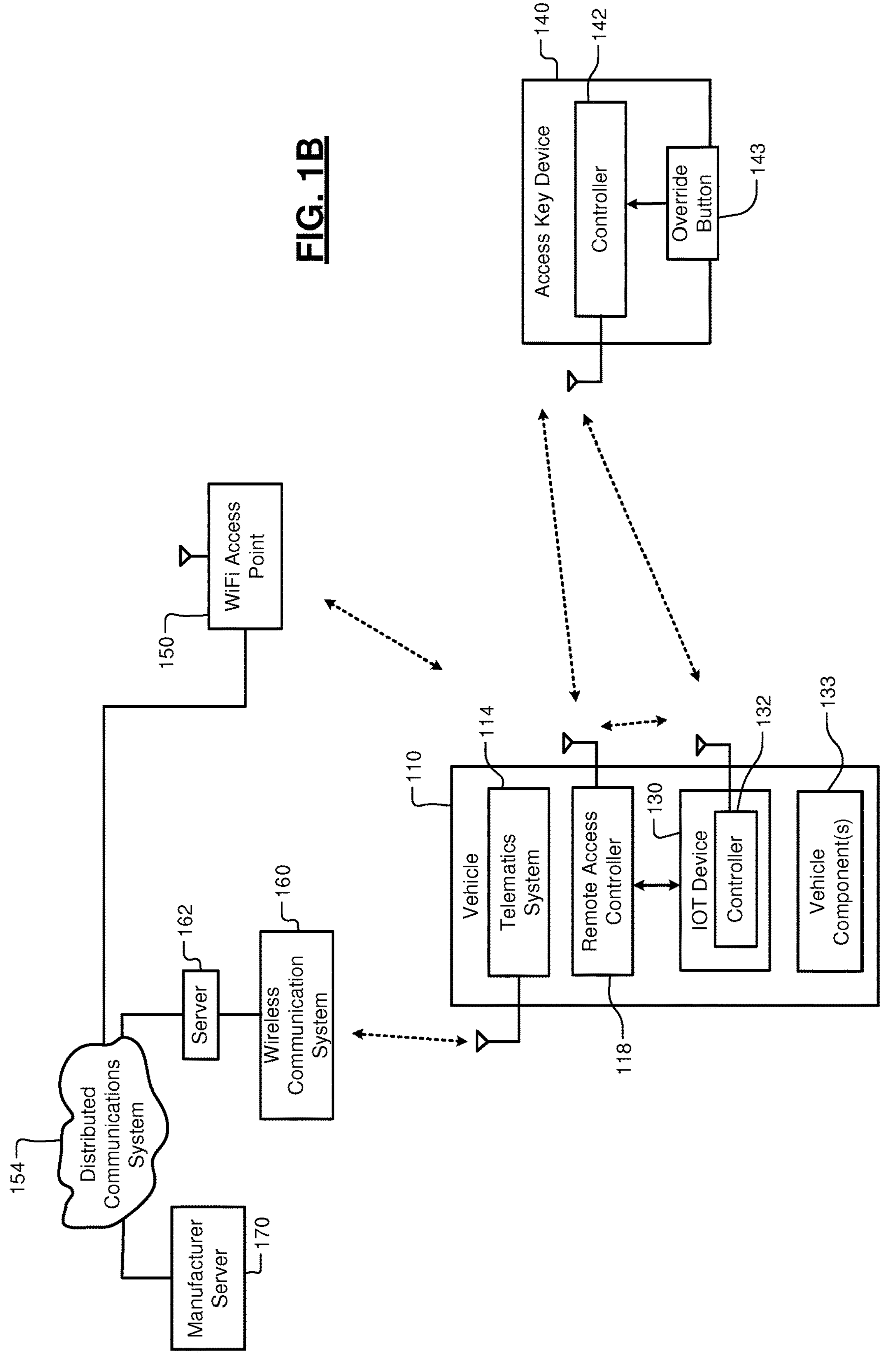

Referring now to FIGS. 1A and 1B, a remote access system for securing remote commands sent by an access key device to a vehicle 110 is shown. A vehicle 110 includes a telematics system 114 that communicates with a wireless communication system 160 such as a cellular or satellite system. In some examples, a manufacturer sends access key software updates and/or remote commands to the vehicle 110. For example, a manufacturer server 170 sends the access key software updates and/or remote commands via a distributed communication system 154 (such as the Internet) to a server 162 in communication with the wireless communications system 160.

The vehicle 110 also includes a remote access controller 118 configured to control components of the vehicle 110 remotely. For example, the remote access controller 118 controls ignition/entry and/or other remote functions by interacting with an access key device 140 and/or an Internet of Things (IoT) device 130 as will be described further below.

The IoT device 130 includes a controller 132 configured to communicate with the vehicle 110 and/or the access key device 140 using any suitable wireless communication protocol. The vehicle 110 includes vehicle components 133 that are configured to be controlled remotely by the access key device 140. In some examples, the vehicle components 133 may include a door lock, a powered door, a heating, ventilation, and air conditioning (HVAC) system, an ignition system, an autonomous driving controller (for remotely calling the vehicle 110), etc. The access key device 140 includes a controller 142 configured to communicate with one or more IoT devices and the vehicle 110. For example, the access key device 140 may include a key fob or a smartphone. In some examples, the access key device 140 includes an override button or pin 143 configured to cause the access key device 140 to operate the vehicle remote access in a conventional manner (e.g., based on the digital key and location relative to the vehicle).

As will be described further below, the vehicle 110, the access key device 140, and the IoT device 130 use a 3-way authentication protocol to prevent vehicle theft. In some examples, the IoT device 130 uses context from the vehicle 110 and the access key device 140 to enhance the security of the access key device 140. In some situations, securing of the access key is enabled when a 3-way agreement exists between the remote access controller 118 of the vehicle 110, the access key device 140, and the IoT device 130. In FIG. 1A, the IoT device 130 and the vehicle 110 are located remotely from one another. In FIG. 1B, the IoT device 130 is located on the vehicle 110 and acts as the IoT controller for securing remote access.

As can be appreciated, the vehicle 110, the access key device 140, and the IoT device 130 can communicate using any suitable wireless protocol such as WiFi, near field communication (NFC), Bluetooth low energy (BLE), and/or other suitable wireless protocols. When the IoT device 130 is located in the vehicle in some implementations, communication with the vehicle can include a wired connection. The IoT device 130 may communicate with a wireless access point 150 that is connected to the distributed communications system 154.

In a first remote access mode illustrated in FIGS. 2 to 4 and described further below, the vehicle 110 exchanges secure information with the access key device 140 and determines the location of the access key device 140 relative to the vehicle 110. Before enabling execution of a remote command from the access key device 140, the vehicle 110 sends a security request to the IoT device 130 to confirm the location of the access key device 140 relative to the vehicle 110. If the IoT device 130 confirms the location of the access key device 140 relative to the vehicle 110, the vehicle 110 enables execution of the remote command. If the vehicle 110 is not located near a known IoT device, then the vehicle 110 proceeds with the traditional approach and executes the command from the access device if the access key device 140 is within range.

In a second remote access mode illustrated in FIGS. 5A to 7 and described further below, if the vehicle 110 is near a known IoT device, the vehicle 110 does not pair with the access key device 140 until the IoT device 130 approves the access key device 140. In other examples, the vehicle 110 does not execute the remote command directly received from the access key device 140. Rather, the access key device 140 pairs with the known IoT device and the IoT device 130 relays the remote command to the vehicle 110. The vehicle 110 executes the remote command if it receives the remote command from the access key device 140 via the IoT device 130. If the vehicle 110 is not located near a known IoT device, then the vehicle 110 proceeds with the traditional approach and executes the command from the access key device 140 if the access key device 140 is within range.

Relay attacks typically take a significant amount of time to implement since the relay attacker needs to determine secure keys used between the vehicle 110 and the access key device 140. That means that the relay attack iterates through a significant number of possible keys before arriving at the secure key that is used by the vehicle 110 and the access key device 140 (e.g., a brute force attack). As a result, the relay attacks are typically performed in locations such as the home or work location of the vehicle 110 owner where the vehicle

110 and access key device are located for longer periods of time. These locations will typically be near IoT devices that can be established as known IoT devices that can be used to enhance remote access security.

When the vehicle 110 is located in other less visited locations, the access key device 140 and the vehicle 110 can use a traditional approach relying on the secure key and the range or location of the access key device 140 since the vehicle 110 is typically located in these locations for shorter periods than are usually required for a relay attack to occur.

Figure 2:
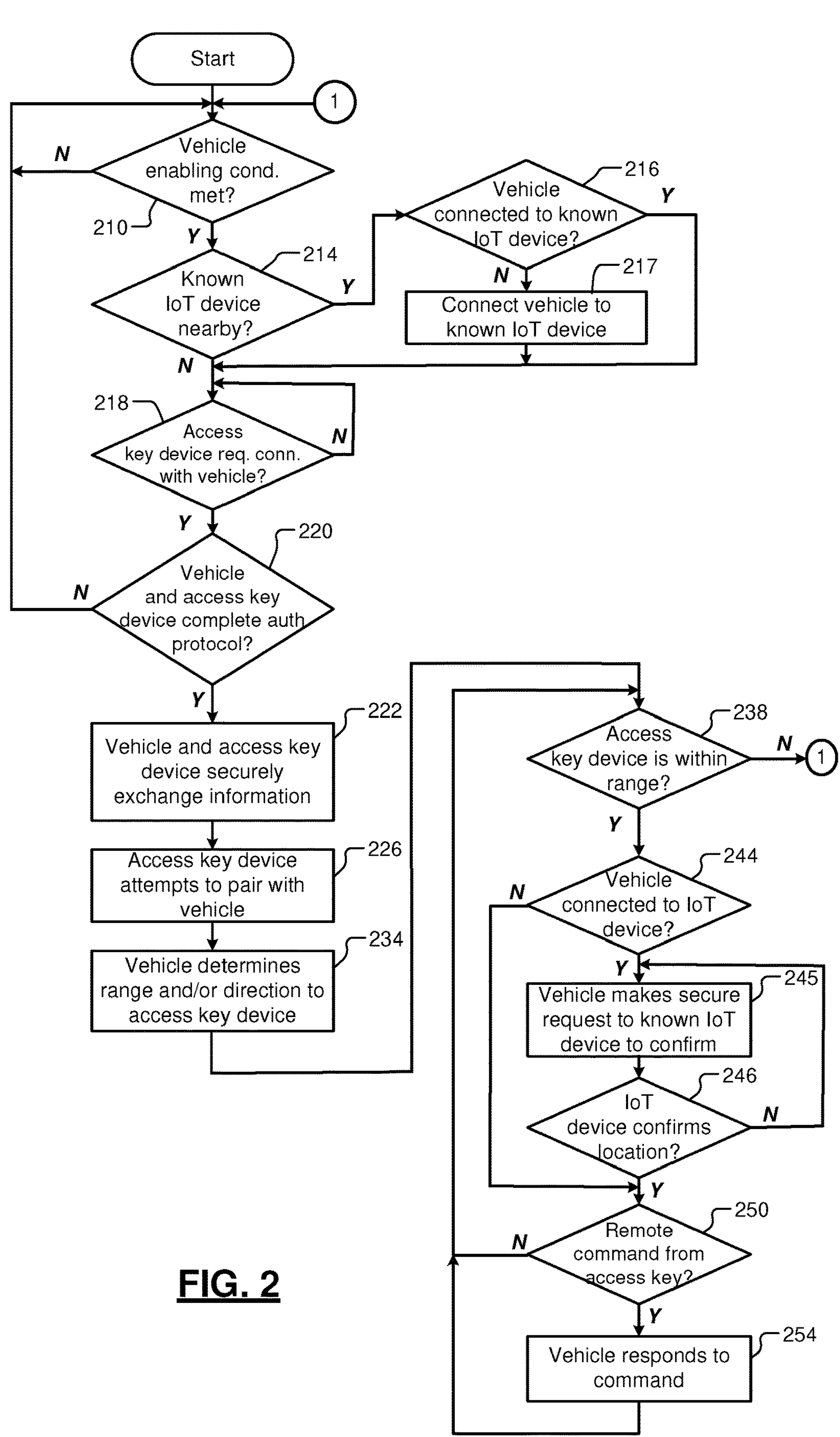
FIGS. 2 to 4 are flowcharts of a first remote access mode performed by the vehicle, the access key device, and the Internet of Things (IoT) device, respectively, for securing vehicle access according to the present disclosure.
Figure 3:
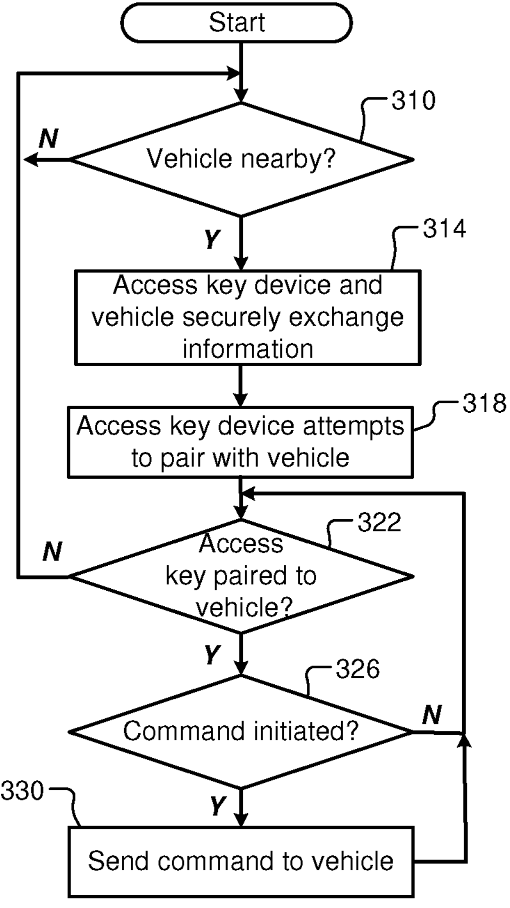
Figure 4:
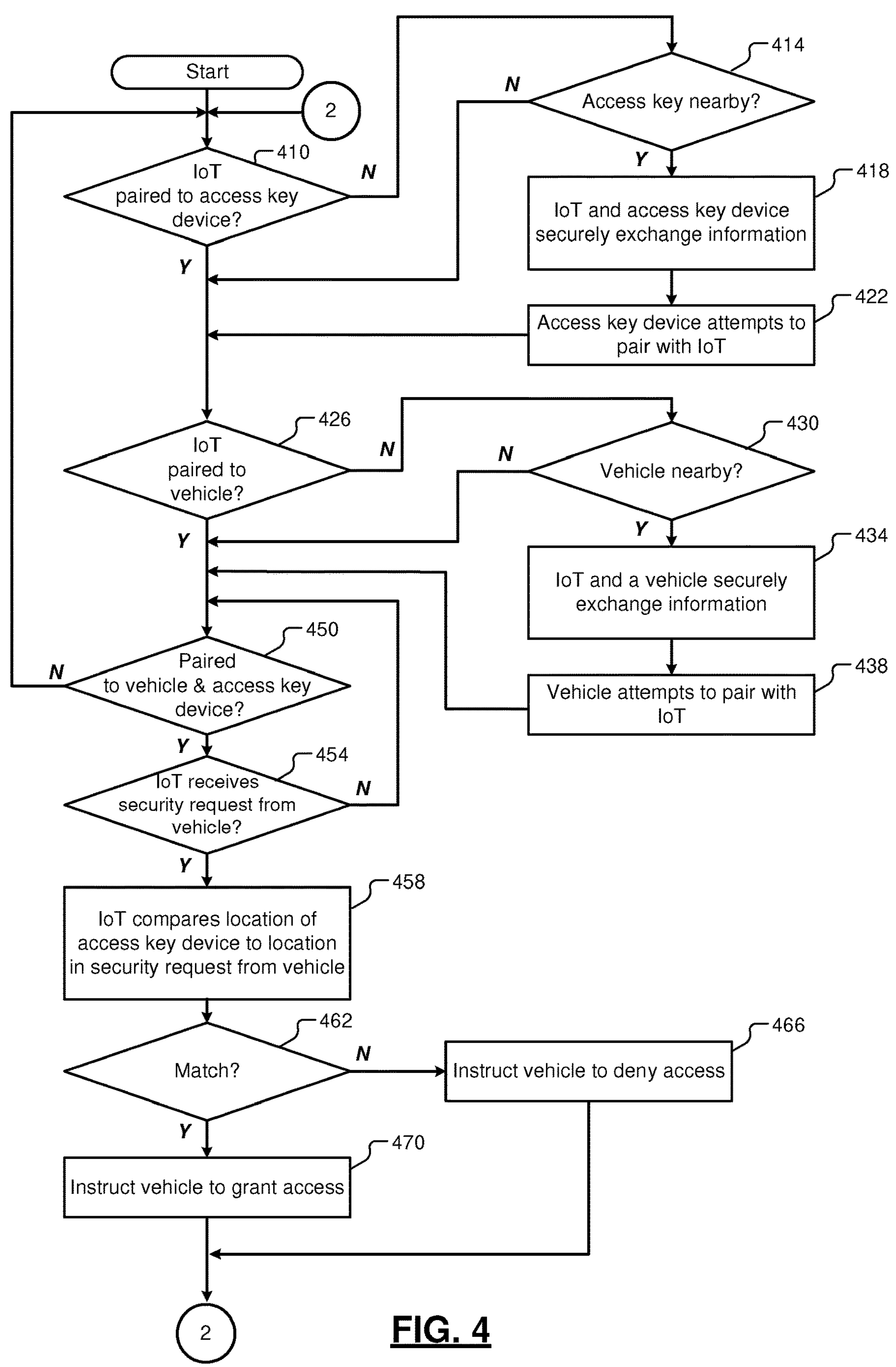

Referring now to FIGS. 2 to 4, a first remote access mode that can be performed by the vehicle 110, the access key device 140, and the IoT device 130 to increase security is shown. In FIG. 2, the method determines if vehicle enabling conditions are met at 210. In some examples, the vehicle enabling conditions are met when the ignition of the vehicle 110 is off, no passengers are located in the vehicle 110, and/or the access key device 140 is located within a predetermined range of the vehicle 110 (although additional or fewer enabling conditions can be used).

If 210 is true, the method determines if there is a known IoT device near the vehicle at 214. If 214 is false, the method determines if the vehicle is connected to a known IoT device. If 216 is false, the method connects to the know IoT device at 217. The method continues from 214 (if false), 217, or 216 (if true) at 218.

At 218, the method determines whether the access key device requests a connection with the vehicle. If 218 is true, the method determines whether the vehicle and the access key device have completed the authentication protocol. If 220 is false, the method returns to 210. If 220 is true, the vehicle and the access key device securely exchange information at 222. At 226, the access key device attempts to pair with the vehicle. At 234, the vehicle determines the location of the access key device (e.g., range and/or direction from the vehicle to the access key device).

At 238, the vehicle determines whether the location of the access key device is acceptable (e.g., range less than a predetermined value). If 238 is true, the method continues at 244 and determines whether the vehicle is connected to a known IoT device. If 244 is true, the vehicle sends a security request to the known IoT device to confirm the location of the access key device at 245.

For example, the vehicle asks the IoT device 130 to confirm the location or the local status of the access key device. In some examples, the IoT device 130 confirms the location or the local status of the access key device based on the location of the access key device relative to the IoT device 130. In some examples, the IoT device 130 confirms the location or the local status of the access key device based on ecosystem knowledge. In some examples, the IoT device 130 confirms the location or the local status of the access key device based by triangulating the location of the access key device relative to the vehicle.

At 246, the method determines whether the IoT device 130 confirms the location or local status of the access key device. If 246 is true, the method continues at 250. At 250, the vehicle determines whether a remote command is received from the access key device. If 250 is true, the vehicle responds to the remote command at 254. If 244 is false and the vehicle is not connected to a known IoT device, the vehicle proceeds without the security request to the IoT device 130.

In FIG. 3, a method performed by the access key device is shown. At 310, the access key device determines whether there is a vehicle nearby. At 314, the access key device and the vehicle securely exchange information. At 318, the access key device attempts to pair with the vehicle. At 322, the method determines whether the access key device is paired to the vehicle. At 326, the method determines whether the user requests a remote command. If 326 is true, the access key device sends the remote command to the vehicle at 330.

In FIG. 4, a method performed by the IoT device when configured in the first mode is shown. At 410, the method determines whether the IoT device is paired to the access key device. If 410 is false, the method determines whether the access key device is nearby at 414. If 414 is true, the IoT device and the access key device securely exchange information at 418. At 422, the access key device attempts to pair with the IoT device.

The method continues from 410 (if true), 414 (if false), or 422 at 426. At 426, the method determines whether the IoT device is paired to the vehicle. If 426 is true, the method determines whether the vehicle is nearby at 430. If 430 is true, the IoT and the vehicle securely exchange information at 434. At 438, the vehicle and IoT device attempt to pair with one another.

The method continues from 426 (if true), 430 (if false), or 438 at 450. At 450, the method determines whether the IoT device is paired with the vehicle and the access key device. At 454, the method determines whether the IoT deice receives a security request from the vehicle. If 454 is true, the method compares the location of the access key device as determined by the IoT device relative to the vehicle to the location in the security request from the vehicle at 458. If the locations match at 462, the IoT device instructs the vehicle to execute the remote command from the access key device at 470. If the locations do not match at 462, the IoT device instructs the vehicle to not execute the remote command from the access key device at 466.

Figure 5A:
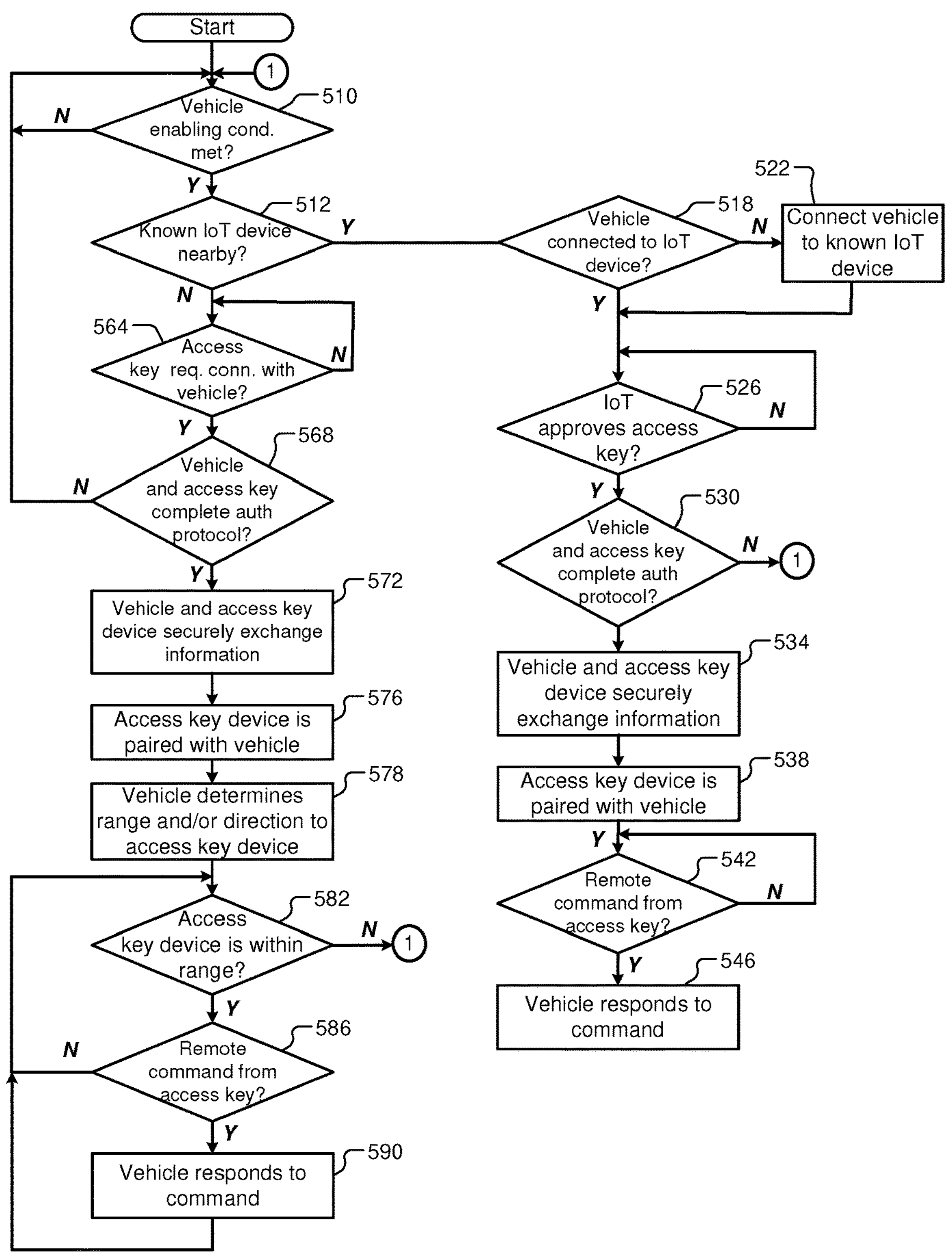
FIGS. 5A to 7 are flowcharts of a second remote access mode performed by the vehicle, the access key device, and the Internet of Things (IoT) device, respectively, for securing vehicle access according to the present disclosure.

Referring now to FIGS. 5A to 7, a second remote access mode for operating the vehicle, the access key device, and the IoT device is shown. In FIG. 5A, the method determines whether vehicle enabling conditions are met at 510. If 510 is true, the method continues at 512 and determines whether there is a known IoT device nearby. If 512 is true, the method determines whether the vehicle is connected to the known IoT device at 518. If 518 is false, the vehicle connects to the known IoT device at 522. The method continues from 518 (if true) and 522 at 526.

At 526, the method determines whether the vehicle receives a message from the IoT device approving the access key device. If 526 is true, the method determines whether the vehicle and the access key device completed the authentication protocol at 530. If 530 is false, the method returns to 510. If 530 is true, the vehicle and the access key device securely exchange information at 534. At 538, the access key device and the vehicle pair. At 542, the method determines whether the IoT device receives a remote command from the access key device. If 542 is true, vehicle responds to the command at 546.

If 512 is false, the method determines whether the access key device requests connection with the vehicle. If 564 is true, the method determines whether the vehicle and access key device have completed the authentication protocol. If 568 is true, the vehicle and access key device securely exchange information at 572. At 576, the vehicle and access key device pair. At 578, the vehicle determines the location of the access key device (e.g., range and/or direction). At 582, the method determines whether the access key device is within range. If 582 is false, the method returns to 510. If 582 is true, the method continues at 586 and determines whether a remote command is received from the access key device. If 586 is true, the vehicle responds to the command.

Figure 5B:
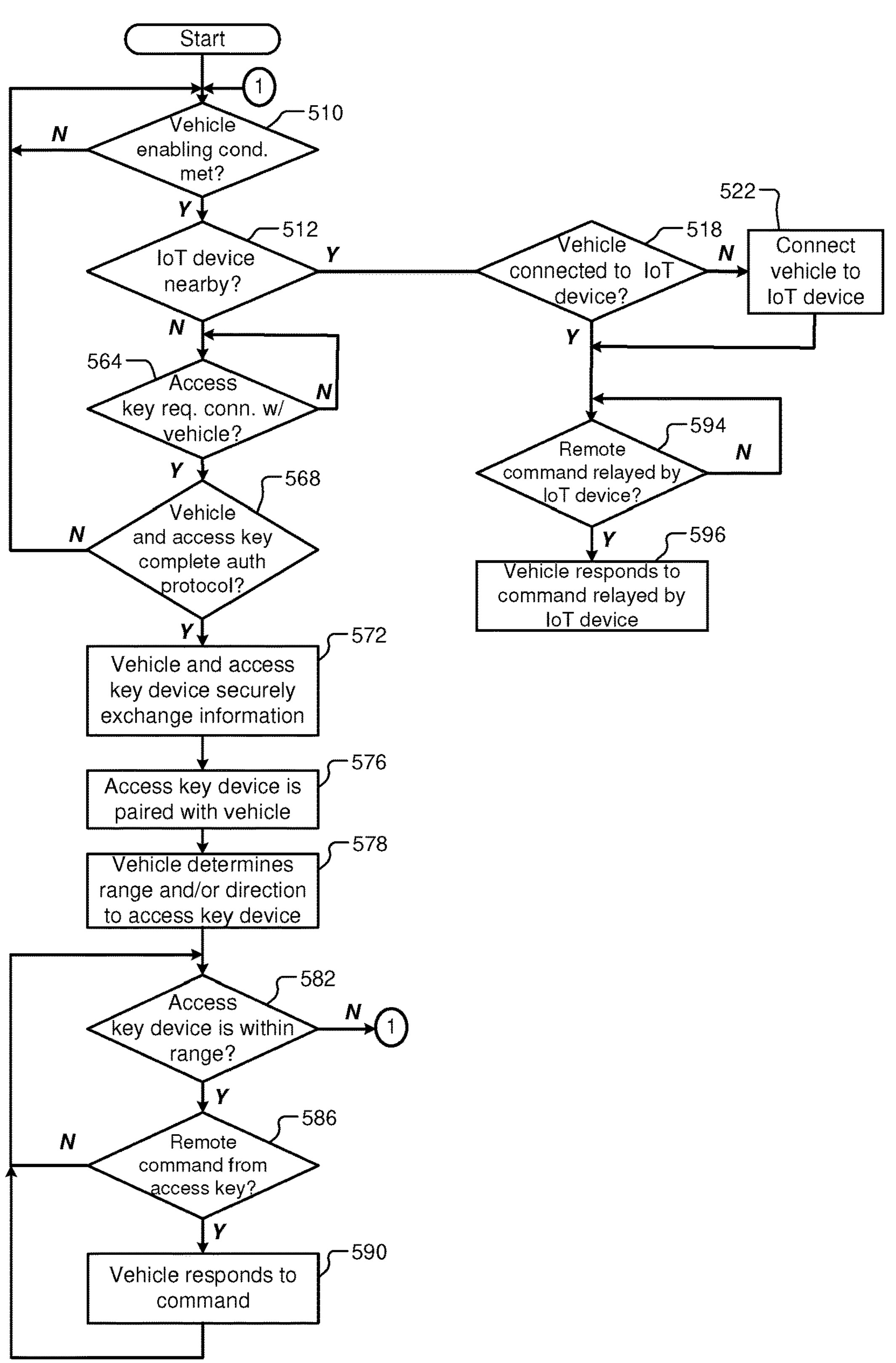

In FIG. 5B, the known IoT device relays the remote command from the access key device. If 518 is true, the method continues at 594 and the method determines whether the IoT device relays the remote command from the access key device. If 594 is true, the method continues at 596 and the vehicle responds to the command relayed by the IoT device at 590.

Figure 6:
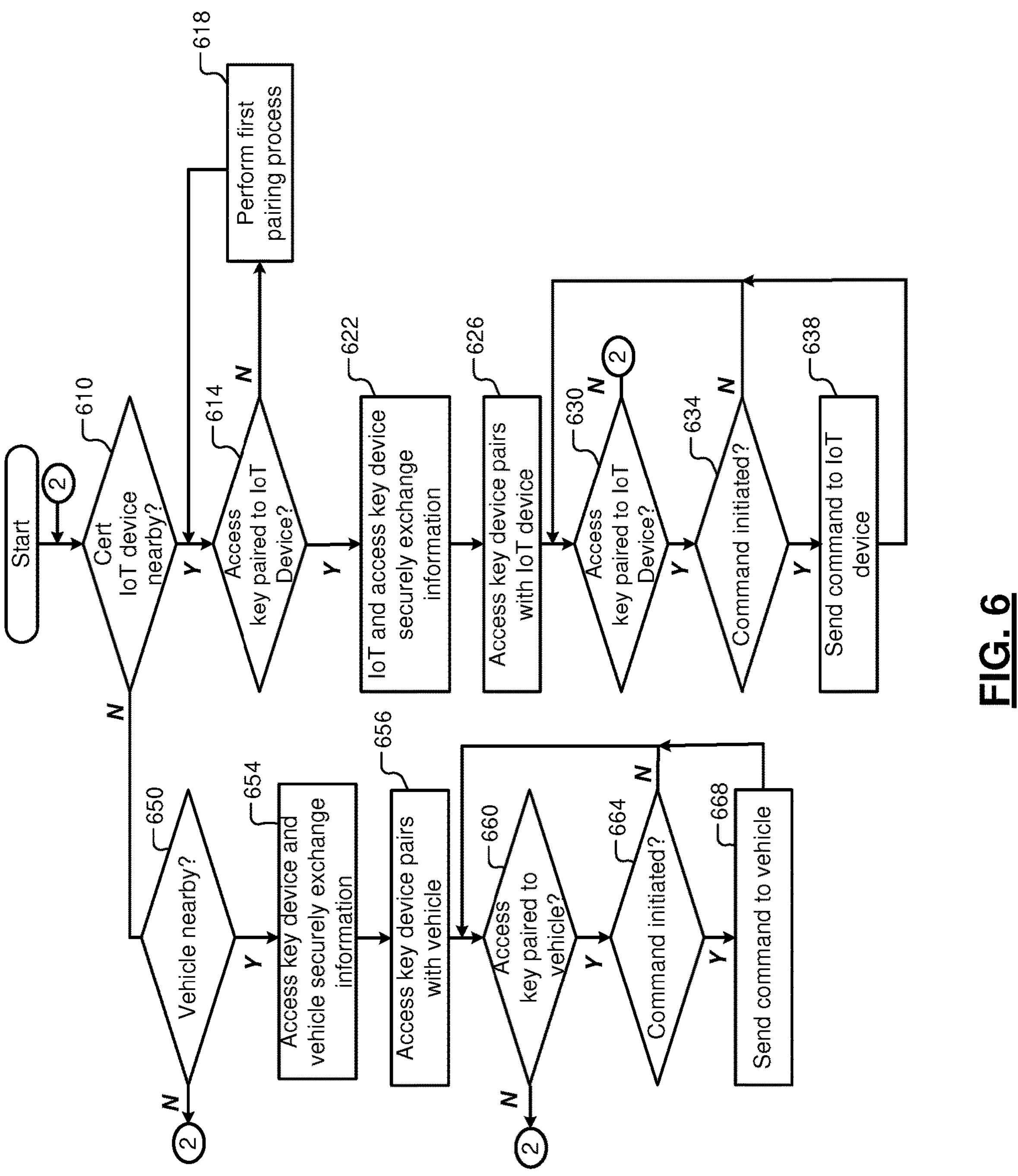

Referring now to FIG. 6, a method for operating the access key device is shown for the example in FIG. 5B. At 610, the method determines whether there is a certified or known IoT device nearby. If 610 is true, the method continues at 614 and determines whether the access key device is paired to the IoT device. If not, the access key device performs the first pairing process at 618. The method continues from 614 (if true) and 618 at 622. At 622, the IoT device and the access key device securely exchange information. At 626, the access key device pairs with the IoT device. At 630, the method determines whether the access key device is paired with the IoT device. If 630 is false, the method returns to 610. If 630 is true, the method determines whether a remote command is initiated by the access key device. If 634 is true, the command is sent to the IoT device, which relays the remote command to the vehicle at 638. In other words, when a known IoT device is within range of the access key device, the access key device does not communicate directly with the vehicle.

If 610 is false and there are no known IoT devices nearby, the method determines whether there is a vehicle nearby at 650. If 650 is true, the vehicle and the access key device securely exchange information at 654. At 656, the access key device pairs with the vehicle. At 660, the method determines whether the access key is paired with the vehicle. If 660 is true, the method determines whether a remote command is initiated by the access key device at 664. If 664 is true, the access key device sends the remote command directly to the vehicle at 668.

Figure 7:
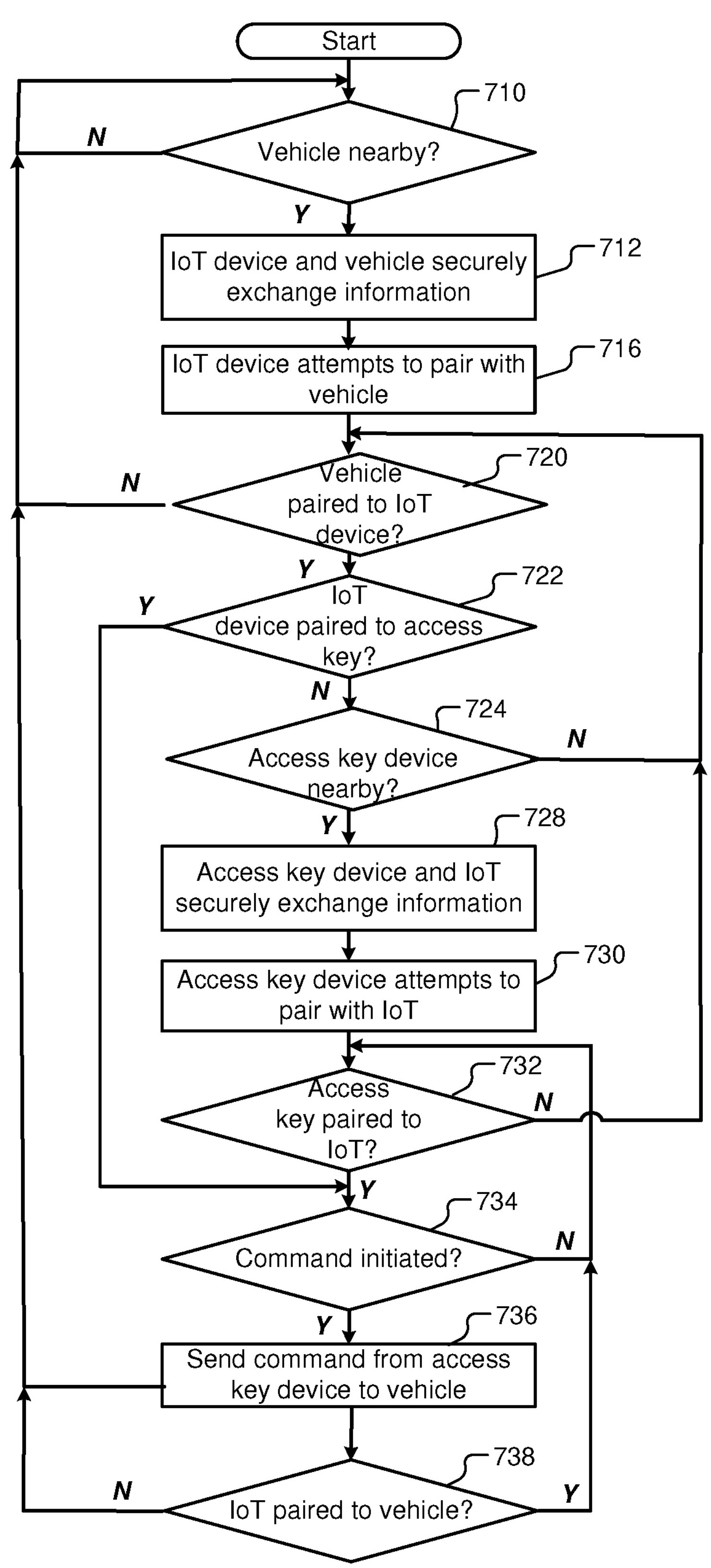

In FIG. 7, a method for operating the IoT device is shown. At 710, the method determines whether there is a vehicle near the IoT device. If 710 is true, the IoT device and the vehicle securely exchange information at 712. At 716, the IoT device attempts to pair with the vehicle. At 720, the method determines whether the IoT device is paired with the vehicle. If 720 is true, the method determines whether the IoT device is paired with an access key device at 722. If true, the method continues at 724.

At 724, the method determines whether an access key device is nearby. If 724 is true, the access key device and the IoT device securely exchange information at 728. At 730, the access key device attempts to pair with the IoT device. At 732, the method determines whether the access key is paired to the IoT device. If 722 or 732 are true, the method continues at 734 and determines whether the access key device initiates a remote command. If 734 is true, the method sends the remote command from the access key device to the vehicle at 736. At 738, the method determines whether the IoT device is paired with the vehicle. If true, the method returns to 732. If false, the method returns to 710.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle comprising:

a remote access controller arranged in the vehicle and configured to selectively execute a remote command originated by an access key device and to attempt to connect with an Internet of Things (IoT) device, wherein if the remote access controller is securely connected to the IoT device, the remote access controller is configured to:

exchange information with the access key device, connect with the access key device, determine a controller location of the access key device relative to the vehicle, determine if the controller location of the access key device is within a predetermined range of the vehicle, and if the access key device is within a predetermined range of the vehicle, send a security request to the IoT device including the controller location of the access key device and a vehicle location of the vehicle; and a vehicle component selectively controlled by the remote access controller based on the remote command, wherein the remote access controller is configured to execute the remote command from the access key device in response to the IoT device confirming the controller location of the access key device relative to the vehicle location of the vehicle, wherein the IoT device is configured to determine an IoT location of the access key device relative to the vehicle, wherein the IoT device is configured to confirm the controller location of the access key device relative to the vehicle location of the vehicle in response to the controller location determined by the remote access controller matching with the IoT location determined by the IoT device.

2. The vehicle of claim 1, wherein the IoT device determines the IoT location of the access key device relative to the vehicle based on ecosystem knowledge context collected from other IoT devices nearby the vehicle and the access key device.

3. The vehicle of claim 1, wherein if the remote access controller is not connected to the IoT device, the remote access controller is configured to execute the remote command if the location of the access key device is within the predetermined range of the vehicle.

4. The vehicle of claim 1, wherein the vehicle component is selected from a group consisting of a door lock, a powered door, a heating, ventilation, and air conditioning (HVAC) system, an ignition system, and an autonomous driving controller of the vehicle.

5. A security system comprising:

the vehicle of claim 1; and the access key device, wherein the access key device includes a first controller configured to connect with the IoT device and the vehicle.

6. The security system of claim 5, further comprising the IoT device.

7. The security system of claim 6, wherein the IoT device includes a second controller configured to connect with the remote access controller of the vehicle and the first controller of the access key device.

8. The security system of claim 6, wherein the IoT device is located one of remotely from the vehicle and in the vehicle.

9. The vehicle of claim 1, wherein the IoT device determines the IoT location of the access key device relative to the vehicle based on triangulating wireless signaling received from the remote access controller with wireless signaling received from the access key device.

10. The vehicle of claim 1, wherein the IoT device is configured to instruct the remote access controller to execute the remote command in response to the controller location of the access key device relative to the vehicle location of the vehicle matching with the IoT location of the access key device relative to the vehicle and to not execute the remote command in response to the controller location of the access key device relative to the vehicle location of the vehicle failing to match the IoT location of the access key device relative to the vehicle.

11. A vehicle comprising:

a remote access controller arranged in the vehicle and configured to selectively execute a remote command originated by an access key device and to attempt to connect with an Internet of Things (IoT) device, wherein if the remote access controller is securely connected to the IoT device, the remote access controller is configured to:

not execute remote commands directly received by the vehicle from the access key device for the vehicle, and execute a remote command originated by the access key device and relayed by the IoT device to the vehicle, and wherein if the remote access controller is not connected to the IoT device, the remote access controller is configured to:

exchange information with an access key device, wirelessly connect to the access key device, determine a location of the access key device relative to the vehicle, determine if the location of the access key device is within a predetermined range of the vehicle, and if the access key device is within the predetermined range of the vehicle, execute a remote command sent by the access key device directly to the vehicle; and a vehicle component selectively controlled by the remote access controller based on the remote command, wherein the IoT device is configured to relay the remote command from the access key device to the vehicle in response to the IoT device confirming a location of the access key device relative to the vehicle, wherein the IoT device is configured to confirm the location of the access key device relative to the vehicle based on at least one of ecosystem knowledge context collected from other IoT devices nearby the vehicle and the access key device and triangulating wireless signaling received from the remote access controller with wireless signaling received from the access key device.

12. The vehicle of claim 11, wherein the vehicle component is selected from a group consisting of a door lock, a powered door, a heating, ventilation, and air conditioning (HVAC) system, an ignition system, and an autonomous driving controller of the vehicle.

13. A security system comprising:

the vehicle of claim 11; and the access key device, wherein the access key device includes a first controller configured to selectively connect to at least one of the IoT device and the vehicle.

14. The security system of claim 13, further comprising the IoT device, wherein the IoT device includes a second controller configured to pair with the remote access controller of the vehicle and the first controller of the access key device.

15. The security system of claim 14, wherein the second controller of the IoT device is configured to relay the remote command from the access key device to the vehicle when the IoT device is connected to the vehicle.

16. The security system of claim 14, wherein the IoT device is located one of remotely from the vehicle and in the vehicle.

17. A vehicle comprising:

a remote access controller arranged in the vehicle and configured to selectively execute a remote command originated by an access key device and to attempt to connect with an Internet of Things (IoT) device, wherein if the remote access controller is connected to the IoT device, the remote access controller is configured to connect with the access key device if the IoT device approves the access key device, and wherein if the remote access controller is not connected to the IoT device, the remote access controller is configured to:

exchange information with an access key device, wirelessly connect to the access key device, determine a location of the access key device relative to the vehicle, determine if the location of the access key device is within a predetermined range of the vehicle, and if the access key device is within a predetermined range of the vehicle, execute the remote command received from the access key device; and a vehicle component selectively controlled by the remote access controller based on the remote command wherein the IoT device is configured to confirm a location of the access key device relative to the vehicle in order to approve the access key device, wherein the IoT device is configured to confirm the location of the access key device relative to the vehicle based on at least one of ecosystem knowledge context collected from other IoT devices nearby the vehicle and the access key device and triangulating wireless signaling received from the remote access controller with wireless signaling received from the access key device.

18. The vehicle of claim 17, wherein the vehicle component is selected from a group consisting of a door lock, a powered door, a heating, ventilation, and air conditioning (HVAC) system, an ignition system, and an autonomous driving controller of the vehicle.

19. A security system comprising:

the vehicle of claim 17; and the access key device, wherein the access key device includes a first controller configured to selectively connect to at least one of the IoT device and the vehicle.

20. The security system of claim 19, further comprising:

the IoT device, wherein the IoT device includes a second controller configured to:

pair with the remote access controller of the vehicle and the first controller of the access key device, and selectively approve the access key device based on a location of the access key device relative to the vehicle, wherein the IoT device is located one of remotely from the vehicle and in the vehicle.

* * * * *